US007424021B2

(12) United States Patent
Wechter et al.

(10) Patent No.: US 7,424,021 B2
(45) Date of Patent: Sep. 9, 2008

(54) METHOD AND APPARATUS FOR PROCESSING NETWORK TOPOLOGY DATA

(75) Inventors: Gabriel Brandon Wechter, Fort Collins, CO (US); Swamy Jagannadha Mandavilli, Fort Collins, CO (US); Zhiqiang Wang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 907 days.

(21) Appl. No.: 10/355,213

(22) Filed: Jan. 31, 2003

(65) Prior Publication Data

US 2004/0151128 A1 Aug. 5, 2004

(51) Int. Cl.
*H04L 12/28* (2006.01)
(52) U.S. Cl. .................. 370/392; 370/252; 370/254; 370/401
(58) Field of Classification Search .................. 370/252, 370/254–8, 400, 471, 392, 389, 395.3, 395.31, 370/395.32, 401; 398/166; 714/1, 3, 4, 53; 709/218, 238, 249
See application file for complete search history.

(56) References Cited

U.S. PATENT DOCUMENTS

| 6,038,233 | A | 3/2000 | Hamamoto et al. | 370/401 |
|---|---|---|---|---|
| 6,108,702 | A | 8/2000 | Wood | 709/224 |
| 6,118,784 | A | 9/2000 | Tsuchiya et al. | 370/401 |
| 6,172,986 | B1 | 1/2001 | Watanuki et al. | 370/466 |
| 6,496,484 | B1 * | 12/2002 | Suzuki | 370/254 |
| 6,587,440 | B1 * | 7/2003 | Dawes | 370/255 |
| 6,804,257 | B1 * | 10/2004 | Benayoun et al. | 370/471 |
| 6,845,091 | B2 * | 1/2005 | Ogier et al. | 370/338 |
| 7,054,867 | B2 * | 5/2006 | Bosley et al. | 707/10 |
| 2004/0081153 | A1 * | 4/2004 | Mayer et al. | 370/392 |

OTHER PUBLICATIONS

IETF Document RFC (2465), "Management Information Base For IP Version 6: Textual Conventions and General Group", Dec. 1998, pp. 1-33.
IETF Document RFC (1981), "Path MTU Discovery For IP Version 6", Aug. 1996, pp. 1-13.
IETF Document RFC (2463), "Internet Control Message Protocol (ICMPv6) For The Internet Protocol Version 6 (IPv6) Specification", Dec. 1998, pp. 1-16.
IETF Document RFC (2462), "IPv6 Stateless Address Autoconfiguration", Dec. 1998, pp. 1-22.
IETF Document RFC (2461), Neighbor Discovery For IP Version 6 (IPv6), Dec. 1998, pp. 1-81.
IETF Document RFC (2460), "Internet Protocol, Version 6 (IPv6) Specification", Dec. 1998, pp. 1-34.

* cited by examiner

*Primary Examiner*—Ricky Ngo
*Assistant Examiner*—Pao Sinkantarakorn (57) ABSTRACT

Network topology data or data indicating a topology of a network, is analyzed and refined by merging portions of the data and removing false data from the network topology data. For example, network topology data is processed by evaluating interface data, deleting erroneous data from the network topology data based on the evaluating, and merging data in the network topology data based on the evaluating.

21 Claims, 4 Drawing Sheets

METHOD AND APPARATUS FOR PROCESSING NETWORK TOPOLOGY DATA

BACKGROUND

It is known to discern the topology of a network from data regarding the network. However, the data can include errors and inconsistent information. For example, false entities, duplicate entities, data overlap, lost connections resulting in isolated islands of entities, and so forth, can result in an inaccurate topology or topology representation. The errors can be introduced, for example, into the topology data via multiple discoveries of the same router from different directions, via partial discovery of a node from a given direction, from partial SNMP (Simple Network Management Protocol) access to a node, from incorrect discovery seeding configurations (for example, human-generated list(s) of devices used as a starting point for discovering nodes or devices in a network), and so forth. The same physical interface can erroneously appear on multiple node entities, and can erroneously appear on a given node multiple times.

U.S. Pat. No. 6,172,986 discloses a mobile node moving from a first IP (Internet Protocol) network having a first kind of IP to a second IP network having a second kind of IP, in a network system. When the mobile node communicates a message with other nodes on the first network after its movement, a header for the movement containing both home and foreign addresses in the first kind of IP is added to a header containing home and foreign addresses in the second kind of IP, and the headers are added to the message.

U.S. Pat. No. 6,188,784 discloses an apparatus for handling communications from both IPv4 and IPv6 terminals.

U.S. Pat. No. 6,038,233 discloses a translator for coupling a first network such as an internet protocol version 4 (IPv4) and a second network such as an internet protocol version 6 (IPv6) having different addressing architectures for IP addresses.

SUMMARY

In an exemplary method, network topology data is processed by evaluating interface data (e.g., interface addresses) in the network topology data, deleting erroneous data from the network topology data based on the evaluating, and merging data in the network topology data based on the evaluating. An exemplary machine readable medium includes software for causing a computing device to perform the exemplary method. An exemplary system for processing network topology data includes means for evaluating interface data in the network topology data, means for deleting erroneous data from the network topology data based on the evaluating, and means for merging data in the network topology data based on the evaluating.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EXEMPLARY EMBODIMENTS

Figure 1:
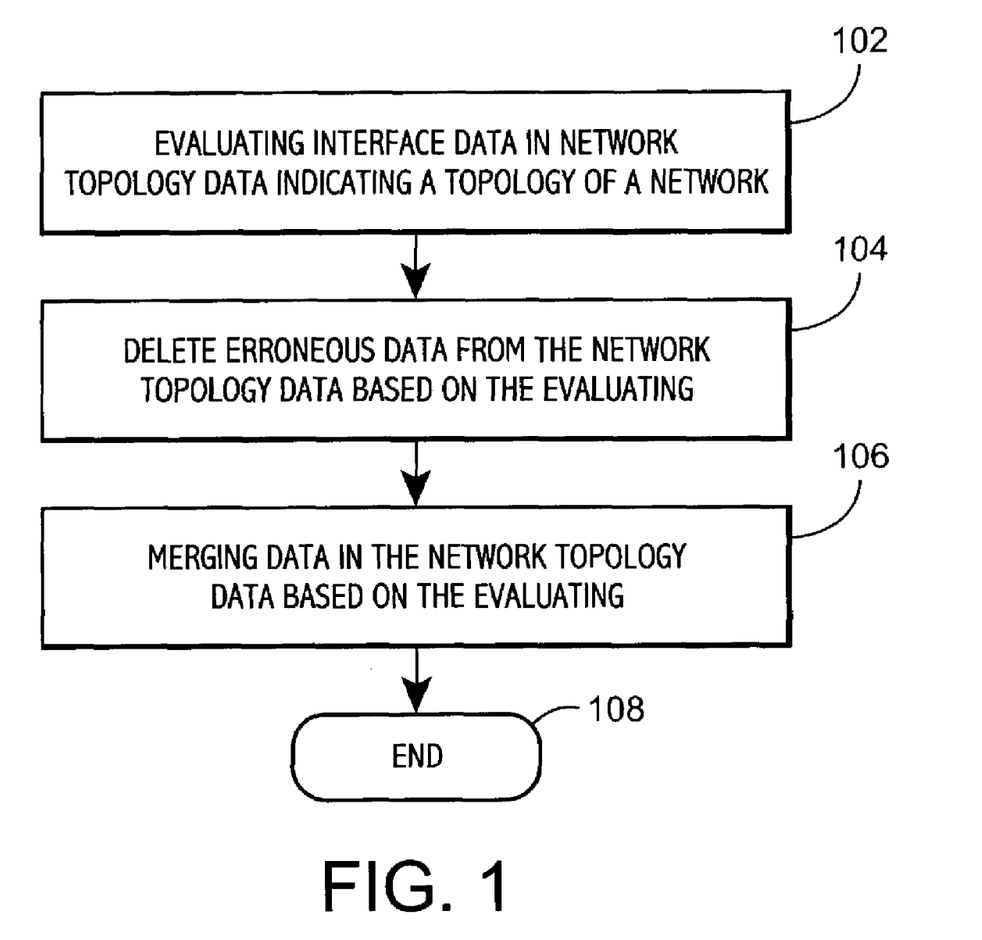
FIG. 1 illustrates an exemplary inventive method.

FIG. 1 illustrates an exemplary method, wherein network topology data, for example indicating or representing a topology of a network, is processed by evaluating interface data (for example, inferring data and/or comparing data) in the network topology data in a block 102, deleting erroneous data from the network topology data based on the evaluating in a block 104, and merging data in the network topology data based on the evaluating in a block 106, whereupon control ends in block 108. As referenced herein, interface data can be an interface address or addresses and/or can be any data associated with a given interface, or with a node to which the interface belongs. The blocks 104, 106 can be performed in different orders, and function(s) in block 102 can be either wholly or partially performed before performance of the functions in blocks 104, 106 are performed. For example, an initial evaluation can indicate that some of the data in the set should be merged, and a further evaluation can indicate that some of the data are incorrect and should be corrected or removed.

Figure 2A:
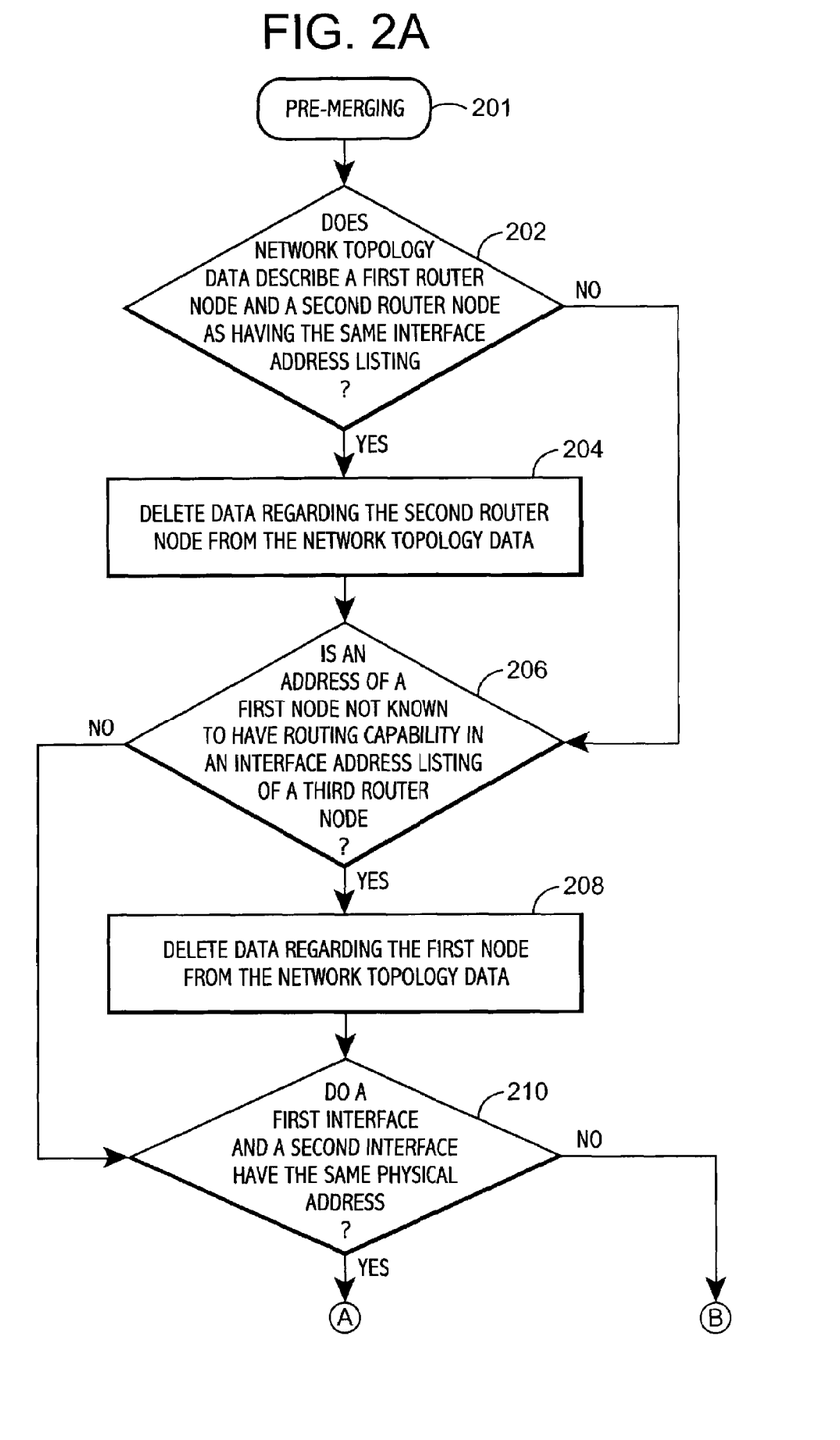
FIGS. 2A-B illustrate exemplary details in accordance with an exemplary method.
Figure 2B:
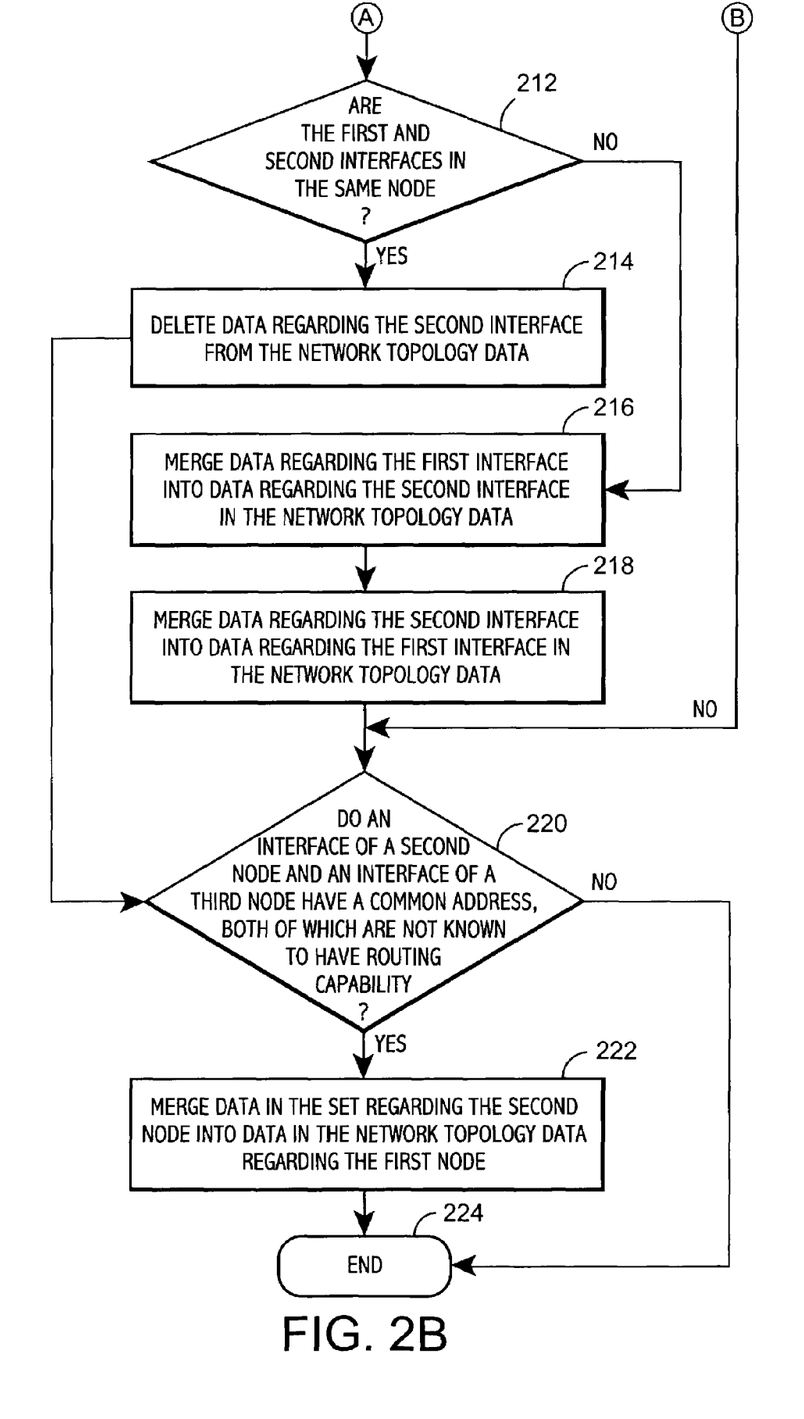

FIGS. 2A-B illustrates additional details consistent with the exemplary method shown in FIG. 1. In a first block 201, a premerging can be performed to evaluate interface data before invoking data merging logic, for example merge stitchers. An exemplary premerging will be discussed later, wherein topology information from, for example, routers such as IPv6 (Internet Protocol version 6) routers, is used to make inferences (such as inferencing regarding connectivity of end nodes in the network, without querying the end nodes).

In block 202, a determination is made whether the network topology data describe a first router node and a second router node as having the same interface address listing. If yes, then control proceeds to block 204, where data regarding the second router node are deleted from the network topology data. From block 204, control proceeds to block 206. If the determination in block 202 is negative, then control proceeds from block 202 to block 206.

In block 206, a determination (for example, a comparison) is made whether the network topology data indicates that an address of a first node (for example, an end node and/or a node not known to have routing capability) is in an interface address listing of a third router node. If yes, then control proceeds from block 206 to block 208, where data regarding the node are deleted from the network topology data. From block 208, control proceeds to block 210. If the determination of block 206 is negative, then control proceeds from block 206 to block 210.

In block 210, a determination (for example, a comparison) is made whether a first interface and a second interface have the same physical address. If no, then control proceeds to block 220.

If the determination in block 210 is affirmative, then control proceeds from block 210 to block 212. In block 212, a determination is made whether the first and second interfaces are in the same node. If yes, then control proceeds from block 212 to block 214, where data regarding the second interface are deleted from the network topology data. From block 214, control proceeds to block 220.

If the determination in block 212 is negative, then control proceeds from block 212 to block 216, where data (for example, in the network topology data) regarding the first interface are merged into data in the network topology data regarding the second interface. From block 216 control proceeds to block 218, where data regarding the second interface are merged into data regarding the first interface in the network topology data. From block 218, control proceeds to block 220.

In block 220, a determination (for example, a comparison) is made whether an interface of a second node and an interface of a third node have a common address. If no, then control proceeds from block 220 to block 224, where the process ends. If yes, then control proceeds to block 222, where data in the network topology data regarding the second node are merged into data in the network topology data regarding the first node. From block 222, control proceeds to block 224 where the process ends.

As with FIG. 1, the processes described in FIGS. 2A-B can be performed in various orders or sequences in accordance with exemplary embodiments.

The functions of blocks 202, 204 of the sequence shown in FIGS. 2A-B can be performed using the following pseudocode:

```
// IPv6 Merge Stitcher(1)
// ==================
//
// This stitcher takes ipv6 data in a raw form and cleans
//    it up using merging logic, to form "cooked" IPv6 Layer
//    topology data.
//
//    PSEUDO-CODE
//    Most objects are the results of operations and queries on
//    databases.
//    This stitcher is called by another stitcher in the dataflow.
//
// Weed through IPv6Layer database.
//
// ----------------------------------------------------------------
// (1.) Case of ipv6Router & ipv6Router entries:
// Same node was discovered as an ipv6Router more than once.
v6LayerRouters = A list of the base entity records that
have been determined to be capable of IPv6 routing.
foreach(v6LayerRouters)
{
   r1Name = this IPv6 router
// if addr-list of two routers match
// drop one, keep other.
   // Get the list of addresses for this node by getting them
   // from interfaces associated with this router.
   r1V6Addrs = list of records of interfaces that are
    local neighbors of (belong to) this base IPv6 router, r1Name.
   These records contain a list of cleaned IPv6 addresses.
   // See if there is another router whose addresses
   // match this list of addresses.
   //
   foreach (r1V6Addrs) {
      for each of this interface's IPv6 addresses {
        thisIpAddr = this IP address.
        // find potential match routers:
        r2ifs = list of all interfaces who are
        part of a known IPv6 router, other than
        r1Name, and that have thisIpAddr in its list
        clean IPv6 addresses.
        foreach (r2ifs) {
           text r2Name = the name of the base node
             that this interface belongs to.
           // check each r2 interface on this base
           // for each v6 address,
           // and see if all of them match to r1 addresses.
           // If so, bingo baby, we have an imposter!
           // (Scooby-doo rips off imposter's mask,
           // exits stage left)
           //
           r2Addrs = list of records containing
            IPv6 addresses from interfaces that
            have r2Name as a base node.
          int possibleMatch = 1;
          foreach (r2Addrs) {
             thisIfsR2AddrList = list of the IPv6 addrs
```

```
             associated with this interface of R2.
             if (possibleMatch == 0) {
                // stop when we rule out a match
                break;
             }
             else {
               for each IPv6 address of thisIfsR2AddrList {
                  if (possibleMatch == 1) {
                     r2thisIpAddr = this particular
                     IPv6 address.
                     r1Match = list of names of
                     interfaces that have r1Name
                     as a base node AND have
                     r2thisIpAddr in their IPv6
                     address list.
                     if (r1Match < > NULL) {
                        // this r2 v6 addr matched
                        // one in v1, so continue
                        // checking the other addresses
                        // At the end of all of them,
                        // if possibleMatch == 1 still,
                        // then we have a match.
                     }
                     else {
                        // these routers are not
                        // mergable matches
                        //
                        possibleMatch = 0;
                        break;
                     }
                  } // fi
               } // rof
             } // esle
          }
          // if still possibleMatch after we get
          // here, all the addresses matched,
          // so lets merge the routers (drop the
          // second router).
          if (possibleMatch == 1) {
             delete record(s) from the database who's
             name field is equal to r2Name.
             delete the local neighbor entries
             of the entry just deleted (those interfaces
             with r2Name as their base node) from
             the database.
          }
       }
    } // rof
  }
}
// end case 1
```

The functions of blocks 206, 208 can be performed using the following pseudocode:

```
/// IPv6 Merge Stitcher(2)
// ==================
//
// This stitcher takes ipv6 data in a raw form and cleans
//    it up using merging logic, to form "cooked" IPv6 Layer
//    topology data.
//
//    PSEUDO-CODE. Most obects that appear below
//    are the result of operations on databases
//    to retrieve specific types of information.
// This stitcher is called by another stitcher in the dataflow.
//
//----------------------------------------------------------------
// (2.) Case of ipv6Router & non-ipv6Router
// (v4Router, v6OnlyNode, unknownNode):
// Ex.) Same node has been discovered as
// both ipv6Router and ipv4Router.
//
nonV6RouterNodes = list of records that are base entities AND
are not known to have IPv6 Routing capability.
```

-continued

```
        foreach(nonV6RouterNodes) {
            nonsName = this particular non-V6Router's name.
            // if any of my ipv6 addresses are in the local nbr
            // of any v6Router, (and MAC addrs are known and same
            // or my MAC is NULL)
            // then delete me.
            //
            myV6AddrLists = list of records containing lists
               of IPv6 addresses from all interfaces that
               have nonsName as a base node.
            // See if there is a v6router who has an address
            // that matches any in this list of addresses.
            //
            foreach (myV6AddrLists) {
               foreach cleaned IPv6 address in this list {
                  thisIpAddr = this particular IPv6 address
                  // find any v6 routers that have an
                  // interface with this address:
                  v6matches = list of all records that are
                     interfaces having base nodes of known
                     IPv6 routers, other than nonsName, and
                     whose IPv6 address list contains
                     thisIpAddr.
                  if (v6matches < > NULL) {
                     // this non-v6 entity is already
                     // accounted for by a known v6 entity,
                     // so delete the non.
                     delete record(s) who's name is equal to
                        nonsName from the database.
                     delete all records who claim nonsName as
                        its base node from the database.
                  }
               }
            }
         } // hcaerof
         // End of case 2.
```

The functions of blocks 210-218 can be performed using the following pseudocode:

```
// IPv6 Merge Stitcher(3)
// ===================
//
// This stitcher takes ipv6 data in a raw form and cleans
//   it up using merging logic, to form "cooked" IPv6 Layer
//   topology data.
//
//    PSEUDO-CODE. Note: Many of the objects below are
//    the result of operations on databases to produce specific information.
// This stitcher is called by another stitcher.
//
//----------------------------------------------------------
// (3.) Case of interface & interface:
// Same interface has been discovered more than
// once in same node or in different nodes.
interfaces = list of all records that are interfaces AND
   do not have a NULL physical (MAC) address, AND not known
   to have IPv6 routing capability.
foreach(interfaces) {
   ifsName = this interface's name.
baseNode = the base node of this interface.
thisMAC = the MAC address of this interface.
// Make sure that interface hasn't been dropped already:
// (due to earlier iterations of this loop, since the list
// "interfaces" is gotten before the loop begins, but we
// are merging inside the loop).
//
stillHere = records of entities who's name matches ifsName.
if(stillHere < > NULL) {
// the record still exists.
// if there is another interface with the same MAC addr
//
sameMACifs = all records that are interfaces, other than
ifsName, AND have a MAC address equal to thisMAC, AND
are not known to be capable of IPv6 routing.
   foreach(sameMACifs) {
      thisDudesBase = the name of this interface's base node.
      thisIfsName = the name of this interface.
      // merge (one-way) the ipv6 addresses into one
      // list ('update' the first).
      //
      foreach of the IPv6 addresses of this interface {
      text thisAddrVal = this particular IPv6 addr.
         Update the database so as to append thisAddrVal
         to the list of IPv6 addresses of the record(s)
         who's entity name is equal thisIfsName AND
         does not already contain that IPv6 address.
      }
      // if they are in the same end node
      //
      if (thisDudesBase == baseNode)
      {
         // Drop the second interface entry (this dude).
         //
         delete records with name equal to thisIfsName
            from the database.
         // Now, remove the dropped interface
         // from the base node's field of
         // interfaces it contains.
         //
         baseContains = single record containing the list
            of interfaces contained by baseNode.
         foreach(baseContains) { //only one
            thisBaseContains = this particular list (only one).
            foreach interface in thisBaseContains {
               text thisContElem = this particular contained
interface.
               if (thisContElem == thisIfsName) {
                  update the database record for baseNode to
                  set this element of its list of contained
                  interfaces to NULL.
               }
            }
         }
      }
      else // they are in different nodes, so merge the
         // opposite way also (and dont drop).
         //
      {
         int totalNumAddrs = thisDudesNumAddrs + numAddrs.
         text addrValNew = "";
         for (itor = 0;
         itor < totalNumAddrs;
         itor = itor + 1) {
            // note: this field was updated above
            // to have all values, so just copy
            // them over to this guy
            //
            addrValNews = record containing list of
               latest IPv6Addresses of thisIfsName.
            foreach(addrValNews) {
               addrValNew = this particular address value
                  indexed by itor.
            }
            update the database by inserting addrValNew
               over the existing value at itor for the record
               whose name is equal to thisIfsName AND that does
               not already contain addrValNew in its list of
               IPv6 addresses.
         }
      }
   } // hcaerof
} // fi stillHere check
}
// End of case 3.
```

The functions of blocks 220-222 can be performed using the following pseudocode:

```
// Ipv6Merge Stitcher(4)
// ==================
//
// This stitcher takes ipv6 data in a raw form and cleans
//    it up using merging logic, to form "cooked" IPv6 Layer
//    topology data.
//
//    PSEUDO-CODE.
//    Note, this stitcher can be called by Ipv6Merge__Main after
Ipv6Merge__3 is
// called.
// That stitcher does some merging that enhances performance of this
stitcher
// for some cases.
// This stitcher operates on raw data that has been discovered and
put into the
// IPv6 database.
// Some of the data you see in this pseudo-code is obtained by complex
logic
// operations on a database to extract specific data that matches a set
of criteria
// used for the database query.
// Create and prime a temporary database, used just to do some analysis of
// addresses
// for being link-local ("link local" concepts are defined in the IPv6
(Internet
// Protocol version 6) IETF (Internet Engineering Task Force) standard,
// which those skilled in the art will be familiar with. In particular, the
// following IETF documents relating to the IPv6 IETF standard are hereby
// incorporated by reference in their entirety: RFC 2460, December 1998;
RFC
// 2461, December 1998; RFC2462, December 1998; RFC 2463,
December 1998;
// RFC 2465, December 1998; and RFC 1981, August 1996).
// --------------------------------------------------------------------
// (4.) Case of non-ipv6Router & non-IPv6Router (end-node & end-node,
for
// example):
// Looks for and handles cases of:
// Same node has been discovered as something other than a v6 Router
more than
// once.
// Sit back and watch this magic!
//
foreach(nonV6RouterNodes) {
    // lets call this "node 1", or "node1Name".
// foreach of the interfaces of this non-v6Router . . .
//
foreach(theIfs) {
    // lets call this "theIfName".
    //
    // if my ipv6 address list (excluding link-local)
    // matches some other non-v6Router's iF list . . .
    //
    for (each of this interfaces v6 addresses) {
        Test for link-local. We are interested in
        non-link local for this merging.
        //
        // non-link locals satisfy:
//     m__Addr NOT LIKE
//     '....:....:....:....:....:....:....,{1,3},.*,.*,1'
    if (that address wasnt link local) {
    // its OK
    // Note that there might be iF matches on
    // more than one node, so although we refer to node1 and node2
    // for the specific object during that loop iteration, the merging
    // may be done across several iterations.
    //
    if (other Matching non-v6Router Interfaces not on
        this node (node 1) who have the
        same non-link-local v6 address in its
        list addresses < > NULL) {
// Merge each of the NODES who contain
// the interfaces in this list into this NODE:
// (Merging nodes, not just IFs.)
    //
    foreach( of these other Matching Interfaces) {
        // Lets call it's base node "node 2".
        int AllAddrsMatch = 1;
        int weHaveAMatch = 0;
        // if all v6 addrs on this interface match
// the other interface (ignoring link local),
        // bingo . . . we've got a merge
        //
        for ( each of node2's addresses ) {
        Test it for link-local.
    if (it wasnt link-local) {
        // its OK
        //
        Check for matches with Node 1's interfaces
        that have match this non-link-local v6 address.
        if (if there is a node1Match) {
            weHaveAMatch = 1;
        }
        else {
            AllAddrsMatch = 0;
            break;
        }
        } // fi link-local test
        } // rof
        // if AllAddrsMatch at this point, then it completely
        // matched an interface on node 1, so merge the base nodes
        //
        if (AllAddrsMatch == 1) { // AND
        if (weHaveAMatch == 1) {
    // We are about to merge.
    // Pick a name, say Node1. Use
    // node1Name from above.
    // Lets just merge our new entry over
    // the existing Node1 entry
    // Merge capabilities lists.
    //
    Get the capabilities of Node2.
    Merge the capabilities lists into Node 1.
        Do not allow duplication.
        Foreach of node 2's unique capabilities, merge
        them onto node 1's list.
    // ------------------
    // get all the interfaces of Node1:
    //
    foreach (node 1's interfaces) {
    // lets call this interface "n1IfName".
    get all interfaces of Node 2, node2Ifs.
    // now merge the info for the interfaces,
    // since the base node, Node 2, is going
    // to be deleted.
    //
    foreach (node2Ifs) {
        // lets call this interface "if2Name",
        // and its physical layer 2 address "MAC2".
        int doIfMerge = 1;
        int atLeastOneMatch = 0;
        // if my v6 addr list matches
        // one in node 1, merge the MAC addrs
        // and capabilities
        //
        // foreach of the v6 addrs of this IF:
        //
        for (each of node 2's v6 addresses) {
            // lets call this address "this Addr".
            if (MAC2 != NULL) {
            matchingNode1Ifs = All interfaces with node 1
                as their base node, AND who have this Addr in
                their v6 address list, AND whos MAC address
                either matches MAC2 OR is NULL.
            }
            else {
            matchingNode1Ifs = All interfaces with node 1
                as their base node, AND who have this Addr in
                their v6 address list.
            }
            if (matchingNode1Ifs == NULL) {
            doIfMerge = 0;
            // TODO: break;
            }
```

-continued

```
        else {
            atLeastOneMatch = 1;
        }
    } // rof
    // if (my list of addresses matches
    // another one in Node 1)
    //
    if (doIfMerge == 1) {    // AND
        if (atLeastOneMatch == 1) {
            foreach (matchingNode1Ifs) {
            // if we are here, we had an interface match.
                Merge the MAC addrs, etc.
                if (one's MAC is NULL and the
                others isnt) use non-null MAC.
                Merge the capabilities . . . 2 --> 1
            }
        } // fi
    } // fi
    else {
        // create a NEW interface with a temporary name, using a
        // unique interface index. Associate its with node 1, by
        // using node 1 as its base entity value. Overwrite the
        // entity with if2Name.
        newIfName =
        node1Name + "[-" + nextUnusedIfAbsVal + "]";
        nextUnusedIfAbsVal = nextUnusedIfAbsVal + 1;
        Add this interface to Node1 with some unused ifIndex.
        Update Node1's "contains" field to include this interface.
    } //esle
delete this interface (of Node2).
    }
}
// Now, after these manipulations, get all new
// Node 1 interfaces, by selecting all entities with
// node 1 as their base. Lets call them allNewN1Ifs.
foreach(allNewN1Ifs) {
    Reassign the final node1's interface indices.
    Get rid of the temporary indices, since we are
    done with the stage when they were needed.
    Make sure new ones are unique.
        Update the base node (node 1) with this info
        as well for its "contains" field.
    }
    delete Node2 itself from the database.
    }   // fi
    }   // fi
    } // hcaerof of the other matching iFs
    } // fi
    } // fi non-link-local test
    } // rof
}   // hcaerof of the node1 iFs
}   // hcaerof of the non-v6 nodes
// Ipv6Merge_4 stitcher finished.
// Merging completed.
```

As already mentioned, pre-merging can be performed at points in the data flow earlier than when the merge stitchers are invoked. When used, pre-merging can impact (e.g., improve) the accuracy of the topology obtained. Many end nodes (such as personal computers, and so forth) do not currently support IPv6-related MIBs (Management Information Bases). IPv6-capable routers, on the other hand do support such MIBs. Using mechanisms discussed herein with respect to exemplary embodiments, it is possible to obtain connectivity information about end nodes without ever querying them directly. For example, rather than comparing interface addresses, remote neighbor information can be taken from routers connected to such end nodes, and used to make inferences about that end node itself. This can result in a more accurate topology representation of that end node and its interfaces by inferring that remote neighbors of routers actually are interfaces belonging to an end node and by inferring capabilities of that interface and node based upon that router's communication and information about that remote neighbor end node. In other words, topology information from routers can be used to make inferences to enrich network topology data with respect to end nodes.

Pre-merging logic can also filter out false duplicate topology entries by resolving interface addresses to DNS (Domain Name System) names. If two interfaces, previously thought to be independent of each other on different entities, resolve to the same entity name such as a DNS name, then they (or interface data of the two interfaces) can be merged at that point into one entity. Uniqueness constraints on database fields ensure that the entity is treated as a single entity for the discovery stage to come rather than as two separate entities. This can reduce and/or eliminate the need for later merging, and increase the efficiency and accuracy of discovery. Cases where DNS resolution fails to determine the need for a merge can be handled later by the inferencing and data operations in the logic of the merge stitchers.

Exemplary embodiments can also use database uniqueness and primary key constraints to prevent duplicate IP (Internet Protocol) addresses from entering the table that contains records of things to query for information during discovery, eliminating the possibility that multiple topology entities will exist for the same IP address. This handles an exemplary case where more than one device may know of a given IP address as a remote neighbor and the discovery process attempts to proceed from those multiple paths and discover it multiple times.

Exemplary embodiments can use intelligent inferencing to produce an accurate topology. Known approaches involve getting MIB (Management Information Base) data directly from nodes, including end nodes. Without the inferencing described herein, these known approaches are more likely to produce inaccurate or incomplete results. Often, nodes (end nodes for example) may not respond to key MIB queries to which complex network devices, such as routers, respond. Without the correlation described herein with respect to exemplary embodiments, data received back from nodes which are entirely or partly non-responsive (for example, end nodes to discovery, which may or may not be end nodes in the network topology because they haven't yet been determined to be IPv6 routers), is taken at face value, and that data is likely to be incomplete and inaccurate.

For example, assume there is interest in a router in a network called "X", and that two possible routes to get to "X" are: A→B→X, and G→H→X, where A,B,G, and H are other devices. Xb and Xh are two different interfaces on X, to which are connected B and H, respectively. When discovery is looking at device B, it finds that it has a neighbor with an address Xb. Similarly, when looking at device H during discovery, a neighbor with an address Xh is identified. Though Xb and Xh are actually interfaces on the same device, this is not yet known, so they are treated as separate during discovery. If X responds to a MIB query made to it on Xb, but does not respond to that query made to it on Xh, known discovery techniques do not determine that the addresses of Xb and Xh are actually two addresses for interfaces on the same device. As such, the discovery would proceed as if there are two devices, one with an address Xb and much more information about it (from the MIB response), and another with an interface Xh (and little information). If this information is taken at face value, as it is in known topology algorithms, a misleading and inaccurate topology can result, and two devices will appear in the topology even though they are actually the same device.

Exemplary embodiments resolve such inaccurate data discovery by avoiding total reliance on complete MIB query response accuracy. This can be accomplished by using DNS to attempt to resolve host names of devices to determine that interfaces (addresses) discovered to be on different devices actually are on the same device. In addition, data gathered from multiple devices that did respond to MIB queries can be used. The logic described herein with respect to exemplary embodiments can be applied to this data under several different cases to eliminate false data and polish the data. The result can be more accurate, more useful and more consistent information.

A situation of two possible routes to get to "X" (A→B→X, and G→H→X) is just one of many examples. It corresponds roughly to blocks 206-208 of the sequence shown in FIGS. 2A-B, and the pseudocode associated with them. A similar case can occur when a user feeds a discovery with "seeds" (that is, devices provided with discovery information at the outset), that result in duplicate data being discovered. Exemplary embodiments described herein can perform inferencing based on several data sources. For example, this can reduce or remove reliance on a response from end nodes. The inferencing/processing logic described herein with respect to exemplary embodiments can be more robust and efficient in producing a topology, since rather than taking incomplete or inaccurate values at face value, exemplary embodiments make correlations that relate the raw data to data obtained from devices that did respond to MIB queries.

Additional conditions and situations that can lead to the merge cases described herein will now be explained with reference to FIGS. 2-3. In particular, four cases will be discussed, where Case 1 corresponds to blocks 202-204 of FIG. 2, Case 2 corresponds to blocks 206-208 of FIG. 2, Case 3 corresponds to blocks 210-218 of FIG. 2, and Case 4 corresponds to blocks 220-222 of FIG. 2.

Figure 3:
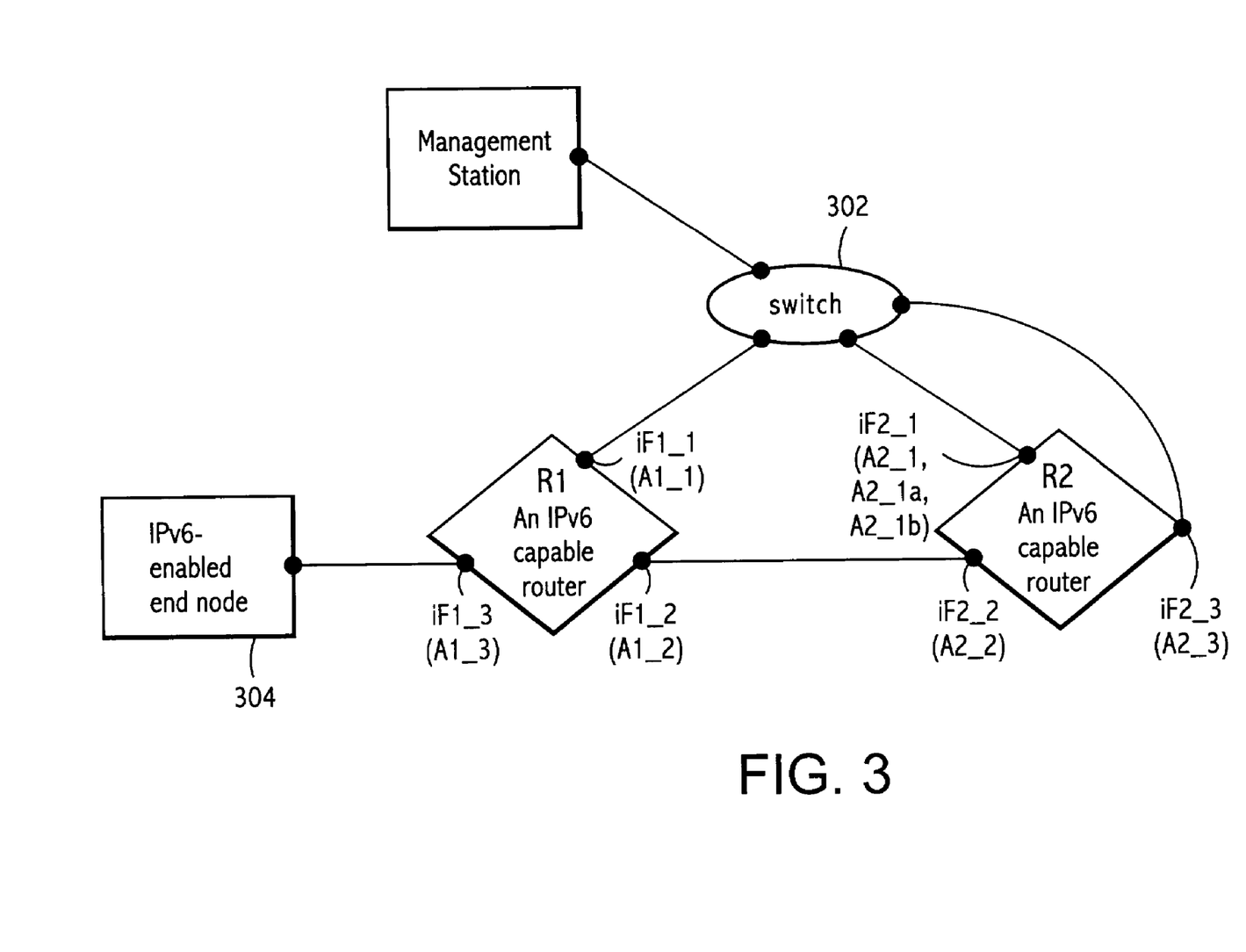
FIG. 3 illustrates conditions in an exemplary network configuration where exemplary embodiments and processes can be advantageously applied.

FIG. 3 shows a Management Station (MS) connected to routers R1 and R2 via a switch 302. The router R1 connects to the switch 302 via an interface iF1_1, and the router R2 has two connections to the switch 302, one via an interface iF2_1 and another via an interface iF2_3. The routers R1, R2 are also connected directly together, with an interface iF1_2 on the R1 side and an interface iF2_2 on the R2 side. (The router R1 also connects to an IPv6-enabled end node 304 via an interface iF1_3). FIG. 3 also shows each interface having at least one IP address associated with it. For example, interface iF1_1 has associated IP address A1_1; interface iF1_2 has associated IP address A1_2; interface iF1_3 has associated IP address A1_3; interface iF2_1 has associated IP addresses A2_1, A2_1a, A2_1b; interface iF2_2 has associated IP address A2_2; and interface iF2_3 has associated IP address A2_3.

With respect to Case 2 (corresponding for example to blocks 206-208 of FIG. 2, and which will be described before Case 1), in an exemplary scenario a user configures discovery with initial or "seed" IP addresses, including for example the IP address A1_1 labeled in FIG. 3 as corresponding to the router R1, and discovery begins. Next, the Management Station (MS) discovers iF1_1 (interface 1 on the IPv6-capable router R1) with IP address A1_1. SNMP queries by the MS to IPv6-related and other MIBs on R1 (via the interface iF1_1) successfully report R1's other interfaces, and that R1 is an IPv6-capable router. R1 (along with its interfaces) is entered into the topology or topology representation as an IPv6 router. The MS also discovers an interface iF2_1 having an IP address A2_1. SNMP queries by the MS to IPv6-related MIBs on the IPv6-capable router R2 (via iF2_1) fail to report that R2 is an IPv6-capable router, but may or may not report the other interfaces on R2. Other queries to IPv4-related MIBs are successful and report that R2 is an IPv4-capable router.

The new "IPv4 router" (R2) is entered into the topology (along with its interfaces). R1 successfully reports its remote neighbors (for example, its connections to other devices), including the address of its neighbor iF2_2. Now that the MS knows of iF2_2, it makes SNMP queries to that address (A2_2) for information about the corresponding node. Unlike earlier queries to iF2_1, queries made to this interface (iF2_2) successfully report that R2 is an IPv6-capable router, and it reports the other interfaces (or "local" neighbors) of R2. The new IPv6 router node (along with its interfaces, iF2_1 and iF2_2) is entered into the topology or topology representation.

With respect to Case 1 (corresponding for example to blocks 202-204 of FIG. 2), assume that, in addition to the steps leading up to merge Case 2 described above, a query to iF2_3 succeeds in the same way that the query to iF2_2 did, and returns the same information. This means that another IPv6 router entry representing R2 is made to the topology or data representing the topology. It will be identical to the entry made due to the query to iF2_2. Note that in Case 2, the IPv6 router entry representing R2 had more complete and accurate information about R2 than the IPv4 router entry representing R2. The merging that occurs involves allowing the more accurate entry to survive and deleting the less accurate duplicate of R2. Case 1 differs from Case 2 in that both entries have equally accurate information. In both Cases 1 & 2, the problem is that there are multiple entries representing the same network entity. In Case 1, however, more than one of the multiple entries is valid, and one of the entries is deleted. A scenario leading to Case 1 (similar to that for Case 2) is to have discovery arrive at a node from multiple neighbors of that node (for example, from "different directions").

Having discussed example situations that could lead to Case 1 (merging of two or more IPv6 router entries), and Case 2 (merging of an IPv6 router with one or more non-IPv6 router entries), example situations that could lead to Cases 3 and 4 will be discussed, which deal with merging of two or more non-IPv6 router entities.

With respect to Case 3, (e.g., blocks 210-218 of the sequence shown in FIGS. 2A-B) and referring to FIG. 3, assume a scenario with discovery progress similar to that described in Case 2. This time, both iF2_1 and iF2_2, queried from different directions, fail to return information that R2 is an IPv6 router. The topology or topology representation will show two non-IPv6 router entries, both with interfaces iF2_1, iF2_2, and iF2_3, and some information about those interfaces.

In this situation, the merging process scans the topology data and detects that two interfaces on separate non-IPv6-routers have the same physical (MAC) address. Consequently, the address lists associated with each interface are merged in both directions. For example, assume during discovery of R2 from one direction, it was determined that iF2_1 had address A2_1. Suppose that during discovery of R2 from another direction, it was determined that iF2_1 was reachable via another IP address. In the case where iF2_1 was discovered on two separate nodes (known because a common MAC address was found), the address list for this interface is updated on both nodes, so that each now also reflects the new information gathered/received from the other. In an exemplary process, this sets up these nodes for possible handling by Case 4 merging.

There is also a situation where the same interface can be detected multiple times on the same node, via different IP addresses, for example. In this situation, discovery will show R2 as containing iF2_1, iF2_2, iF2_3, as well as interfaces iF2_1a and iF2_1b for example, each derived from reaching iF2_1 at separate times via its different IP addresses. In this situation, merging will merge information (such as the IPv6 addresses) from the three incomplete "false" interface entries (iF2_1, iF2_1a, iF2_1b) into one "true" interface that represents the actual single interface on the device R2.

With respect to Case 4 (e.g., blocks 220-222 of the sequence shown in FIGS. 2A-B) and referring to FIG. 3, information regarding non-IPv6-router nodes themselves is examined. Case 4 can also be applied to the scenario described with respect to Case 3. Exemplary details and/or implementation(s) of the Case 4 merging process are described in the exemplary pseudo-code for Case 4, however a simplified explanation follows.

In an exemplary method, the Case 4 merging process looks at each of the (e.g., post-Case 3) interfaces of non-IPv6-routers. If the interface has the same IPv6 address list as some other non-IPv6-router's interface, it can be determined that the entries representing the base nodes of these interfaces are candidates for merging. The resulting merge combines the likely different information of the two (or more) base nodes involved, into one more base node entity with more complete information. The interfaces of the "false" node to be deleted (and their information) are moved over and appended to the "true" node entry.

In exemplary embodiments, the merging accounts for IPv6 link-local and site-local address classes when it considers merging candidates. This allows for proper handling of cases where entries with duplicate addresses should be allowed to exist because they are in different logical address domains.

As the merging Cases 1-4 proceed based on inferencing logic, a polished, accurate topology which looks like an actual network as shown in FIG. 3 results.

The methods, logics, techniques and pseudocode sequences can be implemented in a variety of programming styles (for example Structured Programming, Object-Oriented Programming, and so forth) and in a variety of different programming languages (for example Java, C, C++, C#, Pascal, Ada, and so forth).

Those skilled in the art will recognize that although the pseudocode described herein explicitly provides for the IPv6 IETF standard, the pseudocode and principles therein can be easily adapted to other standards and situations. For example, although reference is made to the IPv6 standard, exemplary embodiments apply generally to topology data merging, and can be applied in various situations with respect to various protocol standards, network arrangements, and so forth.

Those skilled in the art will appreciate that the methods and processes described herein can be implemented in the management station shown in FIG. 3, and/or via software agents under the control of the management station. In exemplary embodiments, any computing device that possesses network topology data can process the data in accordance with the methods and processes described herein, regardless of whether the computing device is part of or separate from the network that the topology data describe. Those skilled in the art will appreciate that the elements and methods or processes described herein can be implemented using a microprocessor, computer, or any other computing device, and can be implemented in hardware and/or software, in a single physical location or in distributed fashion among various locations or host computing platforms. The agents can be implemented in hardware and/or software at any desired or appropriate location.

Those skilled in the art will also appreciate that software can be stored on a machine-readable medium, wherein the software includes instructions for causing a computing device such as a computer, computer system, microprocessor, or other computing device, to perform the methods or processes.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for processing network topology data, comprising:
    evaluating interface data in the network topology data;
    deleting erroneous data from the network topology data based on the evaluating;
    merging data in the network topology data based on the evaluating, wherein data regarding a first node not known to have routing capability is deleted from the network topology data based upon evaluating the interface data against an address of the first node;
    determining whether the network topology data describes a first router node and a second router node having the same interface address listing; and
    deleting data regarding the second router node from the network topology data when the first router node and the second router node have the same interface address listing.

2. The method of claim 1, comprising:
    determining whether two interfaces in the network resolve to the same entity name; and
    merging interface data of the two interfaces when the two interfaces resolve to the same entity name.

3. The method of claim 1, comprising:
    determining whether an address of a first end node is in an interface address listing of a third router node; and
    deleting data regarding the first end node from the network topology data when the address of the first end node is in an interface address listing of the third router node.

4. The method of claim 3, comprising:
    determining whether a first interface and a second interface have the same physical address;
    determining whether the first interface and the second interface are in the same node; and
    deleting data regarding the second interface from the network topology data when the first interface and the second interface have the same physical address and are in the same node.

5. The method of claim 4 comprising:
    merging data regarding the first interface into data regarding the second interface in the network topology data, and merging data regarding the second interface into data regarding the first interface in the network topology data, when the first interface and the second interface have the same physical address and are not in the same node.

6. The method of claim 5 comprising:
    determining whether an interface of a second end node and an interface of a third end node have a common address; and
    merging data in a set regarding the second node into data in the network topology data regarding the first node when the interface of the second end node and the interface of the third end node have a common address.

7. The method of claim 1, comprising:
inferring capabilities of an end node based on communication information from a router connected to the end node without communicating with the end node.

8. A system for processing network topology data, comprising:
means for evaluating interface data in the network topology data;
means for deleting erroneous data from the network topology data based on the evaluating;
means for merging data in the network topology data based on the evaluating, wherein data regarding a first node not known to have routing capability is deleted from the network topology data based upon evaluating the interface data against an address of the first node;
means for determining whether the network topology data describes a first router node and a second router node having the same interface address listing; and
means for deleting data regarding the second router node from the network topology data when the first router node and the second router node have the same interface address listing.

9. The system of claim 8, comprising:
means for determining whether two interfaces in the network resolve to the same entity name; and
means for merging interface data of the two interfaces when the two interfaces resolve to the same entity name.

10. The system of claim 8, comprising:
means for determining whether an address of a first end node is in an interface address listing of a third router node; and
means for deleting data regarding the first end node from the network topology data when the address of the first end node is in an interface address listing of the third router node.

11. The system of claim 10, comprising:
means for determining whether a first interface and a second interface have the same physical address;
means for determining whether the first interface and the second interface are in the same node; and
means for deleting data regarding the second interface from the network topology data when the first interface and the second interface have the same physical address and are in the same node.

12. The system of claim 11, comprising:
means for merging data regarding the first interface into data regarding the second interface in the network topology data, and merging data regarding the second interface into data regarding the first interface in the network topology data, when the first interface and the second interface have the same physical address and are not in the same node.

13. The system of claim 12 comprising:
means for determining whether an interface of a second end node and an interface of a third end node have a common address; and
means for merging data in a set regarding the second node into data in the network topology data regarding the first node when the interface of the second end node and the interface of the third end node have a common address.

14. The system of claim 8, comprising:
means for inferring capabilities of an end node based on communication information from a router connected to the end node without communicating with the end node.

15. A computer readable medium encoded with computer executable instructions to perform a method comprising:
evaluating interface data in the network topology data;
deleting erroneous data from the network topology data based on the evaluating;
merging data in the network topology data based on the evaluating, wherein data regarding a first node not known to have routing capability is deleted from the network topology data based upon evaluating the interface data against an address of the first node;
determining whether the network topology data describes a first router node and a second router node having the same interface address listing; and
deleting data regarding the second router node from the network topology data when the first router node and the second router node have the same interface address listing.

16. The medium of claim 15, wherein the method comprises:
determining whether two interfaces in the network resolve to the same entity name; and
merging interface data of the two interfaces when the two interfaces resolve to the same entity name.

17. The medium of claim 15, wherein the method comprises:
determining whether an address of a first end node is in an interface address listing of a third router node; and
deleting data regarding the first end node from the network topology data when the address of the first end node is in an interface address listing of the third router node.

18. The medium of claim 17, wherein the method comprises:
determining whether a first interface and a second interface have the same physical address;
determining whether the first interface and the second interface are in the same node; and
deleting data regarding the second interface from the network topology data when the first interface and the second interface have the same physical address and are in the same node.

19. The medium of claim 18, wherein the method comprises:
merging data regarding the first interface into data regarding the second interface in the network topology data, and merging data regarding the second interface into data regarding the first interface in the network topology data, when the first interface and the second interface have the same physical address and are not in the same node.

20. The medium of claim 19, wherein the method comprises:
determining whether an interface of a second end node and an interface of a third end node have a common address; and
merging data in a set regarding the second node into data in the network topology data regarding the first node when the interface of the second end node and the interface of the third end node have a common address.

21. The medium of claim 15, wherein the method comprises:
inferring capabilities of an end node based on communication information from a router connected to the end node without communicating with the end node.

\* \* \* \* \*